(12) United States Patent
Zhang

(10) Patent No.: US 7,711,682 B2
(45) Date of Patent: May 4, 2010

(54) SEARCHING HYPERTEXT BASED MULTILINGUAL WEB INFORMATION

(75) Inventor: Ling Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 11/192,477

(22) Filed: Jul. 29, 2005

(65) Prior Publication Data

US 2006/0059132 A1    Mar. 16, 2006

(30) Foreign Application Priority Data

Jul. 30, 2004    (CN) .................. 2004 1 0055624

(51) Int. Cl.
  *G06F 7/00* (2006.01)
  *G06F 17/30* (2006.01)
(52) U.S. Cl. .................. 707/10; 707/723; 707/739
(58) Field of Classification Search ........... 707/710, 707/723, 739
  See application file for complete search history.

(56) References Cited

U.S. PATENT DOCUMENTS

| | | | |
|---|---|---|---|
| 5,999,929 A | 12/1999 | Goodman | 707/7 |
| 6,112,203 A | 8/2000 | Bharat et al. | 707/5 |
| 6,285,999 B1 * | 9/2001 | Page | 707/5 |
| 6,691,108 B2 | 2/2004 | Li | 707/3 |
| 2002/0156763 A1 * | 10/2002 | Marchisio | 707/1 |
| 2003/0061214 A1 | 3/2003 | Alpha | 707/7 |
| 2003/0225763 A1 | 12/2003 | Guilak et al. | 707/7 |
| 2004/0044669 A1 | 3/2004 | Brown et al. | 707/100 |
| 2004/0054670 A1 | 3/2004 | Noff et al. | 707/3 |

* cited by examiner

*Primary Examiner*—Charles Rones
*Assistant Examiner*—Harold A Hotelling
(74) *Attorney, Agent, or Firm*—Michael J. Buchenhorner; Vazken Alexanian

(57) ABSTRACT

The present invention provides methods, apparatus and systems for searching hypertext based multilingual Web information when searching on a network for keywords to be queried. A method includes: a receiving step for receiving keywords input by a user; a native language hypertext searching step for searching on the network, according to the keywords to be queried, for all hypertexts whose representing language is the same as a language representing the keywords and which matches the keywords to be queried; extracting hyperlinks related to an arbitrary language from all the searched hypertexts; a hyperlink ranking step for ranking the extracted hyperlinks according to the correlativity of the hyperlinks with the keywords to be queried; and returning to the user ranked search result. Thereby, an accurate cross language searching can be provided without extra machine translation effort, being more accurate and objective than machine translation, even than human translation.

12 Claims, 5 Drawing Sheets

SEARCHING HYPERTEXT BASED MULTILINGUAL WEB INFORMATION

TECHNICAL FIELD

The present invention relates to a method and system for searching Web information, and in particular to a method and system for searching hypertext based multilingual Web information.

BACKGROUND

Along with the popularization of the Internet, the amount of the content information on the Internet increases dramatically and therefore a method for searching the content to be queried on the Internet by using keywords is also used widely. Especially non-English users represent the fastest growing group of new Internet users, who require obtaining information not only from information sources expressed in their native languages, but also from a large collection of multilingual documents. On the other hand, technologies for the Internet application globalization bring unified methodology to build multilingual Web sites to serve the visitors from the world.

Since most users prefer to search the Web in their mother tongues or it is difficult for them to express the keywords in other languages, for example, it is difficult for many users in non-English countries to express the keywords in English, which is most commonly used by the Internet content. Therefore, these users can only find limited or relative localized information based on current content match approach. To solve the problem, translation based approaches are proposed. These methods use a translation engine, which translates user queries to different languages and then submits to different search engines. The drawbacks of these solutions are obvious: first, machine translation is not as accurate as human translation, and some terms are difficult to translate to target languages that could be understood by search engines; secondly, translation based solution is difficult to be scaled with low cost and effectively, since the all queries must be first caught and translated before being submitted. Huge amount of queries will bring heavy load to the translation engine.

SUMMARY OF THE INVENTION

A general aspect of the invention is to provide solutions to the problem of language translation in the searching of multilingual Web information. The present invention uses a hyperlink approach to solve the language translation problems. The present invention helps global Internet users to find authority Web pages by the query in his/her native language (as described below).

A particular aspect of the invention is to provide methods of searching hypertext based multilingual Web information, searching on a network for keywords to be queried. An example of a method includes the following steps: a receiving step for receiving keywords input by a user; a native language hypertext searching step for searching on the network, according to the keywords to be queried, for all hypertexts whose representing language is the same as a language representing the keywords and which matches the keywords to be queried; a hyperlink extracting step for extracting hyperlinks related to an arbitrary language from all the searched hypertexts; a hyperlink ranking step for ranking the extracted hyperlinks according to the correlativity of the hyperlinks with the keywords to be queried; and an output step for returning to the user ranked search result.

Another aspect of the invention is to provide a system to search hypertext based multilingual Web information, searching on a network for keywords to be queried. An example of a system includes: receiving means for receiving keywords input by a user; native language hypertext searching means for searching on the network, according to the keywords to be queried, for all hypertexts whose representing language is the same as a language representing the keywords and which matches the keywords to be queried; hyperlink extracting means for extracting hyperlinks related to an arbitrary language from all the searched hypertexts; hyperlink ranking means for ranking the extracted hyperlinks according to the correlativity of the hyperlinks with the keywords to be queried; and an output means for returning to the user ranked search result.

BRIEF DESCRIPTION OF THE DRAWINGS

The above aspect and features of the present invention will become more apparent from the following description in conjunction with the drawings, in which.

DRAWING SYMBOLS

Figure 1:
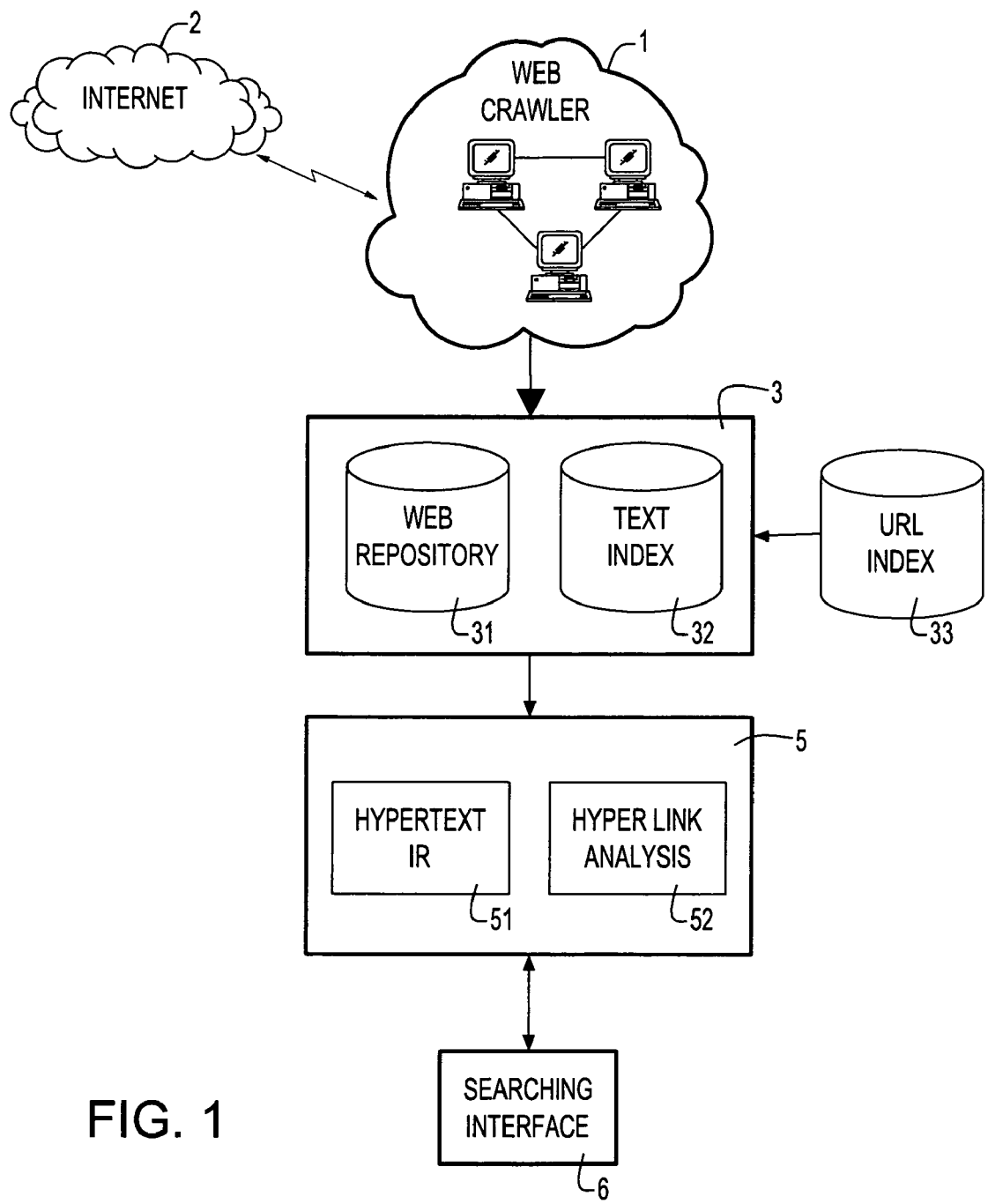
FIG. 1 shows a schematic diagram of a searching system to which an implementation of the present invention is applied.

FIG. 1
  1. Web crawler
  2. Internet
  31. Web repository
  32. text index
  33. URL index
  51. hypertext IR
  52. hyperlink analysis
  6. searching interface FIG. 2
  2. Internet
  13. slave robot
  11. admin console
  14. slave robot
  12. master robot
  15. slave robot
  16. slave robot
  31. Web repository FIG. 3
  开始: start
  101. receive a keyword
  102. search the native language hypertext
  103. extract a URL related to an arbitrary language from the native language hypertext
  104. compute the similarity of the hypertext
  105. compute the rank of the Web page 106. compute the comprehensive evaluation result 107. return the URL ranking result in the form of a hypertext ranking list 结束: end

FIG. 4

URL 索引项: URL registry

索引: index

链接数: link number

标题: title

网页重要程度值: rank

锚定文本: anchor text

URL 索引: URL index

FIG. 5

关键词: keyword 501. receiving means
502. searching means
503. URL extracting means
504. ranking means
505. output means 超文本列表: hypertext list

DESCRIPTION OF THE INVENTION

The present invention provides solutions solving the problems of language translation in the searching of multilingual Web information. It uses a hyperlink approach to solve these language translation problems. The present invention will help global Internet users to find authority Web pages by the query in his/her native language, as described below.

In order to implement the solutions, the present invention provides methods, systems and apparatus for searching hypertext based multilingual Web information, when searching on a network for keywords to be queried. A particular embodiment includes the following steps: a receiving step for receiving keywords input by a user; a native language hypertext searching step for searching on the network, according to the keywords to be queried, for all hypertexts whose representing language is the same as a language representing the keywords and which matches the keywords to be queried; a hyperlink extracting step for extracting hyperlinks related to an arbitrary language from all the searched hypertexts; a hyperlink ranking step for ranking the extracted hyperlinks according to the correlativity of the hyperlinks with the keywords to be queried; and an output step for returning to the user ranked search result.

The present invention also provides a system of searching hypertext based multilingual Web information for searching on a network for keywords to be queried. An example system includes: receiving means for receiving keywords input by a user; native language hypertext searching means for searching on the network, according to the keywords to be queried, for all hypertexts whose representing language is the same as a language representing the keywords and which matches the keywords to be queried; hyperlink extracting means for extracting hyperlinks related to an arbitrary language from all the searched hypertexts; hyperlink ranking means for ranking the extracted hyperlinks according to the correlativity of the hyperlinks with the keywords to be queried; and an output means for returning to the user ranked search result.

By using the hypertext based multilingual Web information searching method and system, an accurate cross language searching can be provided without extra machine translation effort. Moreover, conducting multilingual Web information searching by using hypertexts is more accurate and objective than machine translation, even than human translation. An advantage of the present invention is that it can establish the relationship between the keywords expressed in a user's mother tongue (native language) and target documents without translation by identifying a Web hyperlink structure and collecting HTML hyperlink texts linked to Web pages (abbreviated as "hypertext") from multilingual Web pages.

From a study of the Web the following facts are noted. First, although most high quality Web contents are composed in English language, there are translated versions scattered around the Web, and these globalized contents are either tailored or simply a hyperlink to their original version locations. Second, many Web surfers wish to find a start point to solve their particular problems, and these problems could be programming tips, official FAQs (frequently asked questions) or how to begin a new search topic. For such search requirements, users want the authority pages of the solutions, regardless of whether these pages are in their native language. The authority pages and a central Web page show a relation of strengthening each other: a good central Web page represents that a Web page points to many good authority pages; and a good authority page represents that a Web page is pointed by many good central Web pages.

Web document includes navigation links by placing hyperlink in the page. Usually the page author will assign the hyperlink a description text to tell the reader what the hyperlink is about, and the description is called hypertext or anchor text. A Web page may be linked by thousands of pages, or even millions of for popular sites. Each hypertext pointed to a same URL (Web page) may be varied due to different page composers and their preferred languages. For example, the homepage of Carnegie Mellon University is www (followed by) cmu.edu, CMU. However, in a Chinese Web page, etc. including Chinese characters, the hyperlink to the university homepage will be "卡内基梅隆大学 (Carnage Mellon University)", and so on. For another example, the homepage of Kyoto University is www (followed by) Kyoto-u.acjp, while in the Chinese and Japanese Web pages, etc. including Chinese characters, the hyperlink text of the university will be "京都大学 (Kyoto University)". Here, "京都大学 (Kyoto University)" is both Japanese hypertext and Chinese hypertext. It can be understood that, along with the development of international exchange, hypertexts of different languages can be provided on a same Web page or Web site to facilitate readers' queries. For example, a Chinese hypertext can be provided on a Japanese Web site or an English Web site, and a hypertext in another language, such as an English hypertext, can also be provided on a Chinese Web page. After a reader conducts a hypertext query based on his familiar language, a further selection is conducted as to whether to read the original content linked to by the hypertext.

The present invention only defines the representing language of the hypertext to be searched is identical to the representing language of keywords. Those skilled in the art can understand that defining the type of the Web page language to be searched is not necessary for the present invention.

Therefore, there are multilingual hypertexts for a same URL (Web page), and these hypertexts in different languages are optimized "translation" because the hypertexts are not word to word translation but human interpretation that tells the visitors what the page is about. Moreover, hypertext is more accurate and objective than machine, or even human translation.

That is, the basic idea of hypertext based multilingual Web search is to retrieve related URLs according to the hypertexts and their target URLs. Useful Internet resources can be distinguished by using "concept" translation and expanding queries through iterative searching regardless of the language used by each Web page. In addition, by using a statistical approach, hypertext based searching further removes the hyperlinks such as "click it", which has little value.

For example, supposing a Chinese Internet user tries to locate the homepage of "*Reader's Digest*" magazine, he/she will input "读者文摘 (Reader's Digest)" (keyword) expressed in Chinese, since many Chinese Web pages include hyperlinks to the Web site of the magazine of "*Reader's Digest*" and most of the hypertexts corresponding to the hyperlinks include "*Reader's Digest*" expressed in Chinese (读者文摘 (Reader's Digest)), by matching the hypertexts with the keyword and analyzing the hyperlink distribution, the URL www (followed by) rd.com of the magazine of "*Reader's Digest*" can be retrieved.

Hereinafter, an embodiment of the present invention will be described in detail with reference to the drawings. FIG. 1 shows a schematic diagram of a searching system to which an implementation of the present invention is applied. Referring to FIG. 1, the searching system comprises a Web crawler 1 connected to the Internet 2, which downloads Web pages from the Internet 2. The searching system also comprises a data index module 3, an analysis evaluation module 5 and a searching interface 6.

Below, the process that the searching system of the present invention provides a searching service will be described.

Before providing the searching service, Web crawler 1 downloads from the Internet 2 Web pages as many as possible, and stores them in a Web repository 31. Then the data index module 3 extracts from the Web pages all the hyperlink texts and corresponding hyperlink addresses as well as Web page titles, and provides indices for fast access. The data index module 3 completes primitive processing of the data, makes the above index data form a URL DB (database) and stores them in the Web repository 31. The Web repository 31 includes a URL DB and a URL registry. The URL registry is used for accessing quickly the data entry in the URL DB, that is to say, once a certain URL is specified, the data corresponding to the URL can be found directly in the URL DB according to the URL registry, without searching from the first entry to the last entry in the URL DB. In FIG. 1, a URL index 33 is a unique index value in the URL DB, to which each URL corresponds, while a text index 32 refers to the index of a corresponding hyperlink text, i.e., indexing the text so as to implement fast looking up. The structure of URL DB will be described in detail hereinafter.

Via the searching interface 6, a user submits a search service request, i.e., submits the keyword to be queried, then the searching interface 6 transfers the keyword to be queried to the analysis evaluation module 5. The analysis evaluation module 5 dynamically matches the keyword to be queried based on the existing index data. The analysis evaluation module 5 comprises a hypertext IR (information retrieving) 51 and a hyperlink analysis 52. The hypertext IR 51 computes the similarity S of each hypertext with respect to the keyword to be queried, while the hyperlink analysis 52 computes the rank of each Web page (URL), and then the analysis evaluation module 5 conducts comprehensive evaluation based on the computing results of the hypertext IR 51 and the hyperlink analysis 52, and ranks the results of comprehensive evaluation. Finally, the analysis evaluation module 5 returns the ranking result to the user through the searching interface 6, and then the user can find the URL meeting the requirements most closely.

Figure 2:
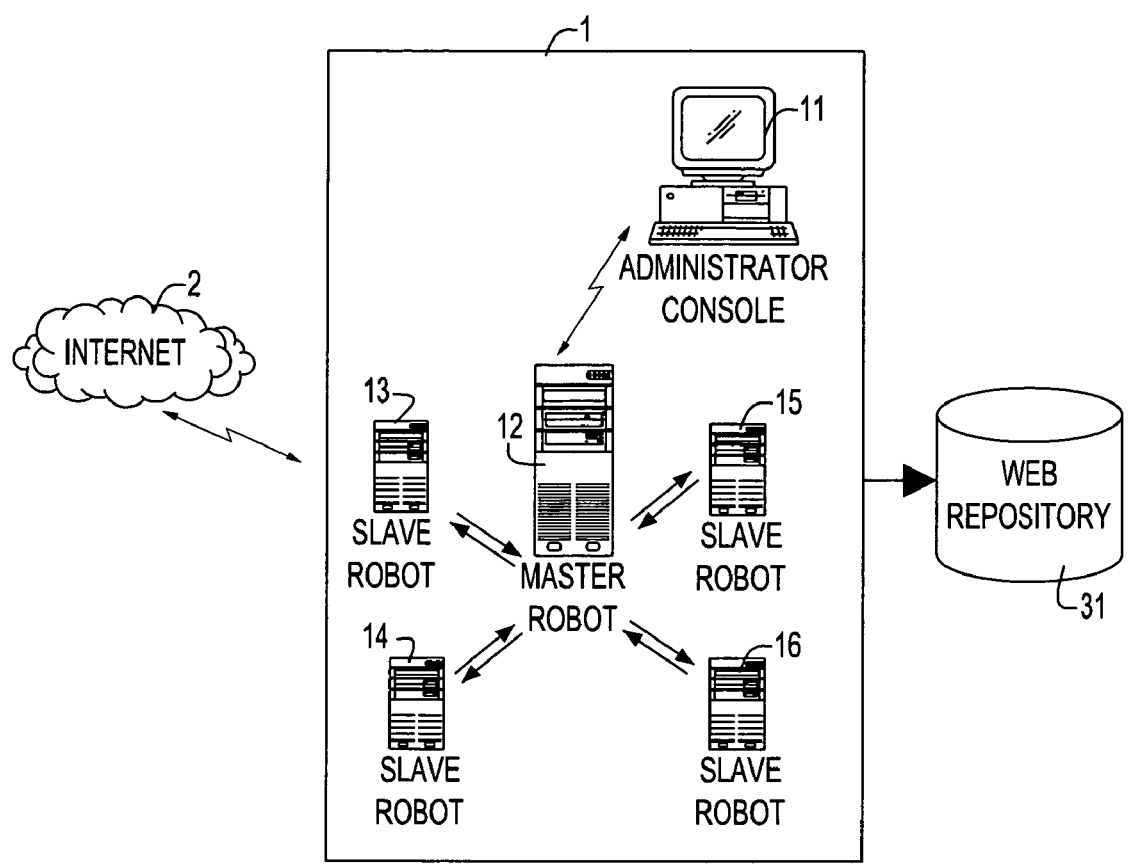
FIG. 2 shows in more detail the configuration of Web crawler 1 in FIG. 1.

FIG. 2 describes in more detail the configuration of the Web crawler 1 in FIG. 1. In FIG. 2, the Web crawler 1 comprises an administration console 11, a master robot 12 and slave robots 13-16, that is, FIG. 2 shows a distributed configuration of the Web crawler 1. Of course, the Web crawler 1 can also be configured as a single host. Through the control of the master robot 12, the administration console 11 coordinates with the slave robots 13-16, downloads Web pages from the Internet 2 and stores them in the Web repository 31 shown in FIG. 1.

Figure 3:
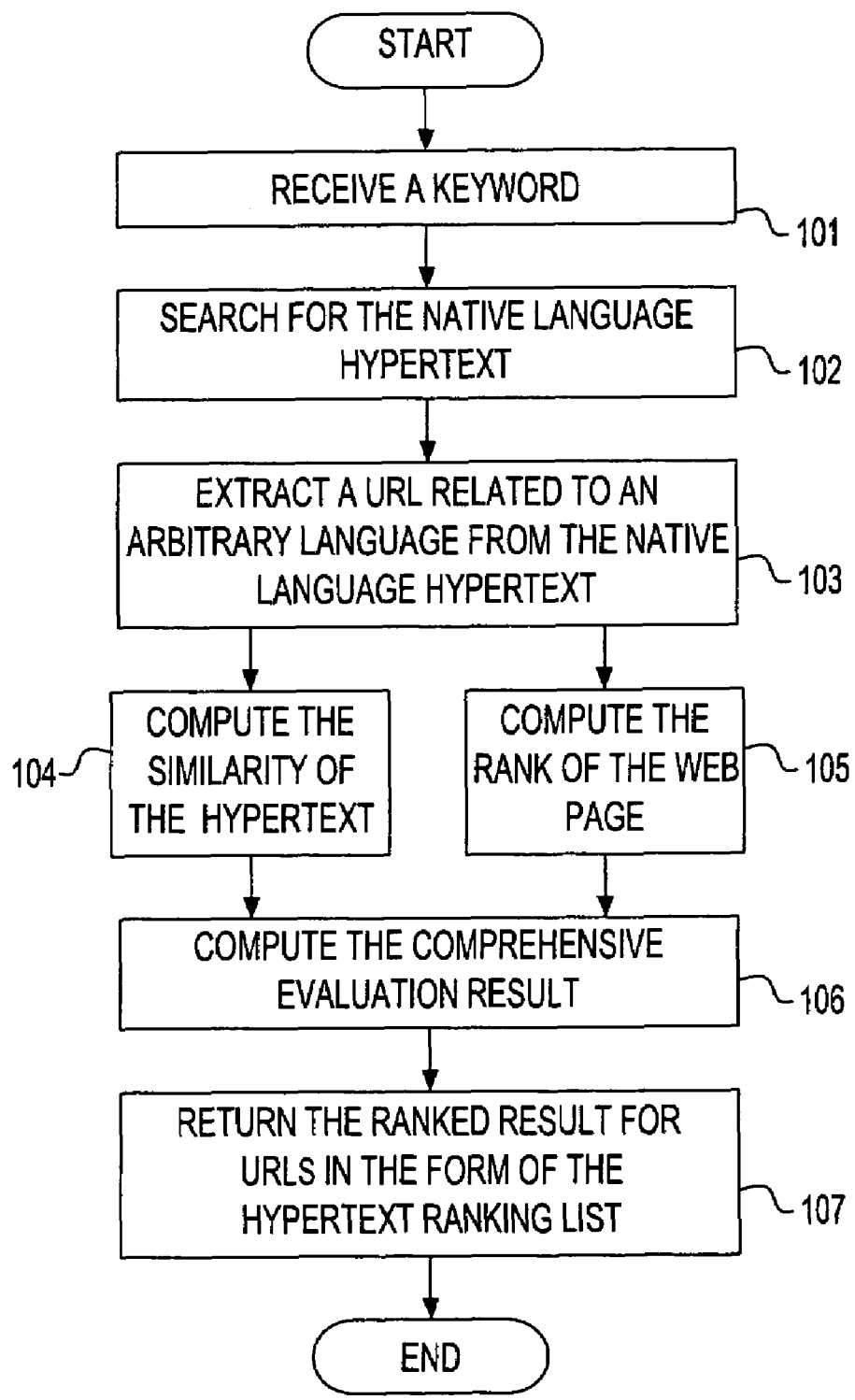
FIG. 3 shows a flowchart of a method for searching hypertext based Web information according to the present invention.

Referring to FIG. 3, a flowchart of a method for searching hypertext based multilingual Web information according to the present invention is described. First at step 101, a user submits a keyword in a language A (i.e., native language) to request for a query. The native language is usually the mother tongue of the user. For example, the language A is Chinese and the keyword is "上海交通大学 (Shang Hai Jiao Tong Da Xue)". After receiving the keyword in the language A (e.g., Chinese), such as "上海交通大学 (Shang Hai Jiao Tong Da Xue)", at step 102, all the hypertexts expressed in the language A are searched and are matched with the keyword such as "上海交通大学 (Shang Hai Jiao Tong Da Xue)". Preferably, the search can be implemented quickly by using the index data in the URL DB downloaded and established by the data index module 3 from the Internet. As described above, the text index 32 shown in FIG. 1 is the index of a corresponding hyperlink text, and a quick looking up can be implemented by indexing the text. Therefore, all the hypertexts expressed in the language A, which match with the keyword, can be obtained. As described below in FIG. 4, in the URL DB, the hypertext matching with the keyword "上海交通大学 (Shang Hai Jiao Tong Da Xue)" include "交大 (Jiao Da)", "上海交大 (Shang Hai Jiao Da)", "交通大学 (Jiao Tong Da Xue)", "上海交通大学(Shang Hai Jiao Tong Da Xue)", "上交大 (Shang Jiao Da)" and "上海交大 (Shang Hai Jiao Da)".

At step 103, a URL is extracted from all the matched hypertexts expressed in the language A, and the extracted URL relates not only to pointing to the Web page expressed in language A, but also to pointing to the Web page expressed in the language other than the language A. Therefore, by extracting the URL to which the hypertext corresponds, the expansion to multilingual information searching is implemented. Preferably, by using the "URL index" in the URL DB described below in FIG. 4, the URL corresponding to each hypertext can be extracted quickly.

At step 104, a similarity S of the hypertext with respect to the keyword to be queried is computed. Each of hypertext $d_i$ and keyword Q can be represented by a vector. The cosine value of the angle between the two vectors represents their similarity S, and VSM (vector space model) expressed by the following equation is introduced to compute the text similarity S.

$$S(d_i, Q) = \frac{\sum_{j=1}^{n} d_{ij} \cdot q_j}{\sqrt{\sum_{j=1}^{n} d_{ij}^2 \cdot \sum_{j=1}^{n} q_j^2}} \quad (1)$$

where $d_i$ represents the i'th hypertext in the Web page d, $d_{ij}$ represents the j'th dimension of the i'th hypertext, and $q_j$ represents the j'th dimension of the keyword Q. The j'th dimension means that, each of a hypertext and a keyword can be divided into a multi-dimensional vector, for example, a hypertext "IBM software group" is a three dimensional vector, while a keyword "IBM software development tool" is a four dimensional vector. For the Chinese language, each Chinese character corresponds to one dimension, while for the English language, each word corresponds to one dimension. If the hypertext $d_i$ conforms to the keyword Q completely, the value of S is 1; if no word in the hypertext $d_i$ appears in the keyword Q, then the value of S is 0.

Meanwhile, at step 105, the rank of a URL (Web page) is computed. Popular Web pages can be found through Web hyperlink tracing, and there are more hyperlinks pointing to high quality Web pages than average. The rank of a URL (Web page) can be obtained by the following recursive and/or iterative computation.

$$PR(v) = \varepsilon/n + (1-\varepsilon) \sum_{u,v \in G} PR(u)/outlink(u) \qquad (2)$$

where, PR(v) refers to the rank of the Web page v, which is determined by the PR values of all the Web pages including the hyperlink pointing to it. For example, the Web page v is linked by 10 Web pages, then the ranks of these 10 Web pages determine the rank of the Web page v; outlink(u) refers to the number of all the hyperlinks in the Web page u (which necessarily include the hyperlink to v); n is the number of all Web pages; and $\varepsilon$ is an adjusting parameter representing the influence degree of the hyperlink linked to the Web page v in the page of equation (2) on the computing result. The greater the value of $\varepsilon$ is, the more a single hyperlink linked to the Web page contributes to the PR value of v. The value of $\varepsilon$ is typically between 0-1, and it is preferable to be 0.1-0.2 which is an optimum value according to the experimental evaluation.

Next, at step 106, by combining the hyperlink (hypertext) similarity S and URL (Web page) rank PR(v), a comprehensive evaluation can be conducted to obtain the following result.

$$R(d) = PR(d)\{1 + \delta \cdot S(d,Q)\} \qquad (3)$$

where, R(d) is the value of a comprehensive evaluation result combining the equations 1 and 2, which computes dynamically the rank of each Web page with respect to a certain keyword according to the fixed rank value PR(d) of each Web page d and the keyword Q. Where, S represents the similarity of hypertext $d_i$ included in the Web page d with respect to the keyword Q; the parameter $\delta$ is used to adjust the weight of the equation 1 and the equation 2 in the equation 3; and $\delta$ represents whether the influence of the hyperlink analysis in equation 3 on the result of the equation is greater or the influence of the result of text correlation analysis on the result of the equation is greater, the value of which is between 0-1. The greater $\delta$ is, the greater the influence of text correlation on the result of the equation is, and $\delta$ is preferably to be 0.4.

Thereby, ranking is conducted according to the comprehensive evaluation result of equation 3, for example, ranking is conducted according to the size of the value of R(d), where the value of R(d) of the Web address most correlated with the keyword to be queried is the greatest. Then at step 107, the ranked result is returned to the user in the form of a hypertext list, for example. In the hypertext list, the known HTML representing forms are usually used: each hypertext corresponds to its URL address, which can link to the Web page pointed to by it.

Optionally, at a hyperlink ranking step, the rank of a hyperlink can be determined according to the number that the hyperlink is pointed to. The hyperlink that is pointed to most including the information matched most with the keyword to be queried, and correlates most with the keyword to be queried, so the hyperlink is ranked first.

Figure 4:
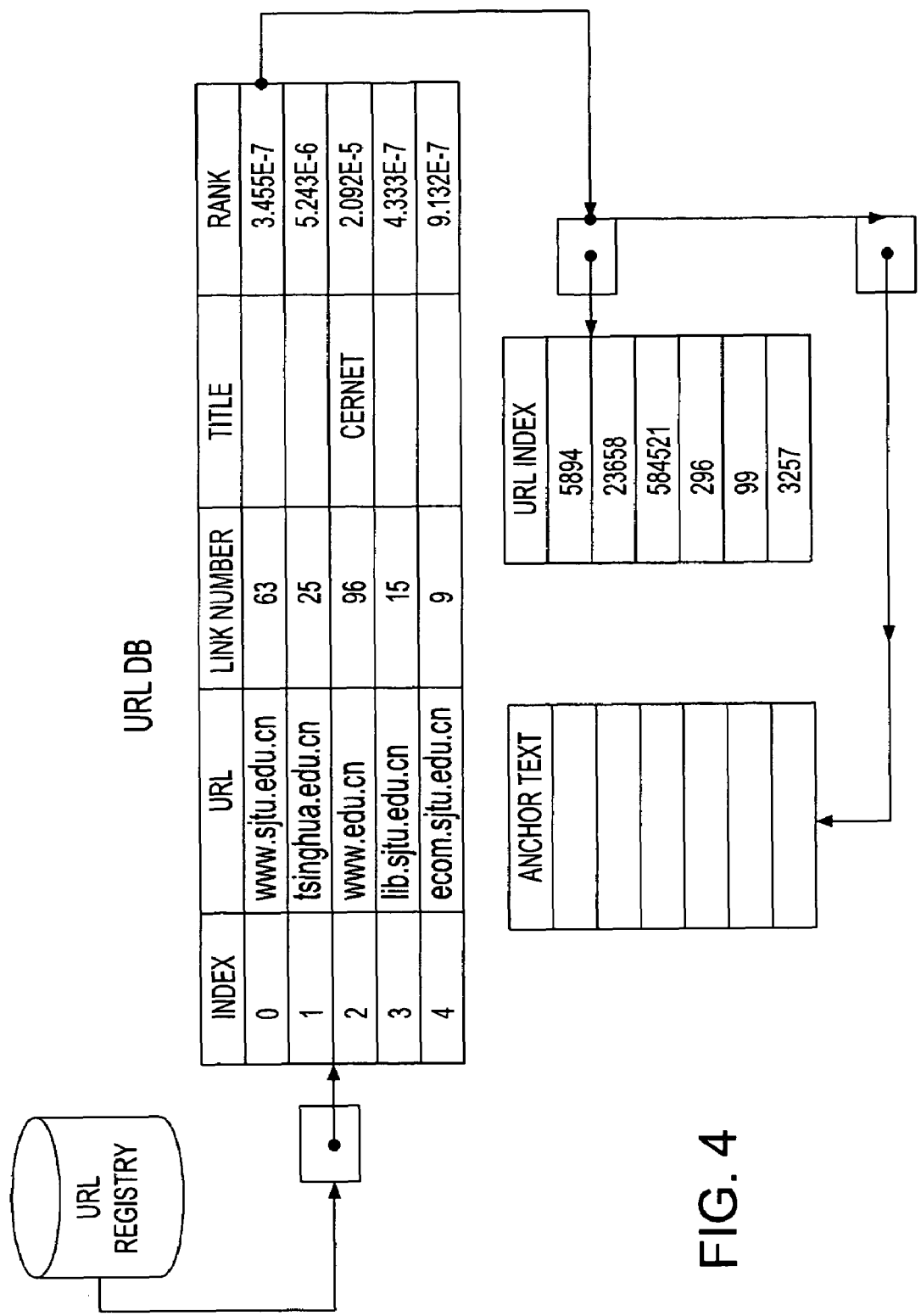
FIG. 4 shows a structure of URL (uniform resource locator) DB (DataBase)

FIG. 4 shows the structure of URL DB. In FIG. 4, each entry of data in the URL DB can be indexed through URL registry, a piece of record data can be located quickly by using the index, and each URL corresponds to one Web page. In FIG. 4, an "index" field represents the index number of URL; a "URL" field represents the address of a Web page, i.e., URL; a "link number" field represents the number of hyperlinks in the Web page; a "title" field represents the title of the Web page; a "rank" field represents the value of the rank of the Web page (i.e., PR, Page Rank), which is obtained by using the above equation 2; an "anchor text" field represents all the hyperlink texts (hypertexts) linking to the Web page, all the anchor texts being indexed to form a text index, which means that the text index is similar to a catalogue for quickly retrieving the hyperlink texts in the URL DB; and a "URL index" field represents the index value in the URL DB of a Web page including the hyperlink of the Web page. For example, a Web page in FIG. 4 who's "URL" is "www.sjtu.edu.cn" has an index value of 0 in the URL DB. The number of the hyperlinks in the Web page is 63. The title of the Web page is "上海交通大学(Shang Hai Jiao Tong Da Xue)", and its PR value is 3.455E-7. All the hyperlink texts linking to the Web page are shown in the "anchor text" field, i.e., include "交大 (Jiao Da)", "上海交大 (Shang Hai Jiao Da)", "交通大学 (Jiao Tong Da Xue)", "上海交通大学 (Shang Hai Jiao Tong Da Xue)", "上交大(Shang Jiao Da)" and "上海交大(Shang Hai Jiao Da)", while the index values in the URL DB, of the Web pages including the hyperlinks of the Web page, corresponding to the above hyperlink texts respectively, are shown in the "URL index" field, i.e. are correspondingly "5894", "23658", "584521", "296", "99" and "3257", respectively.

Figure 5:
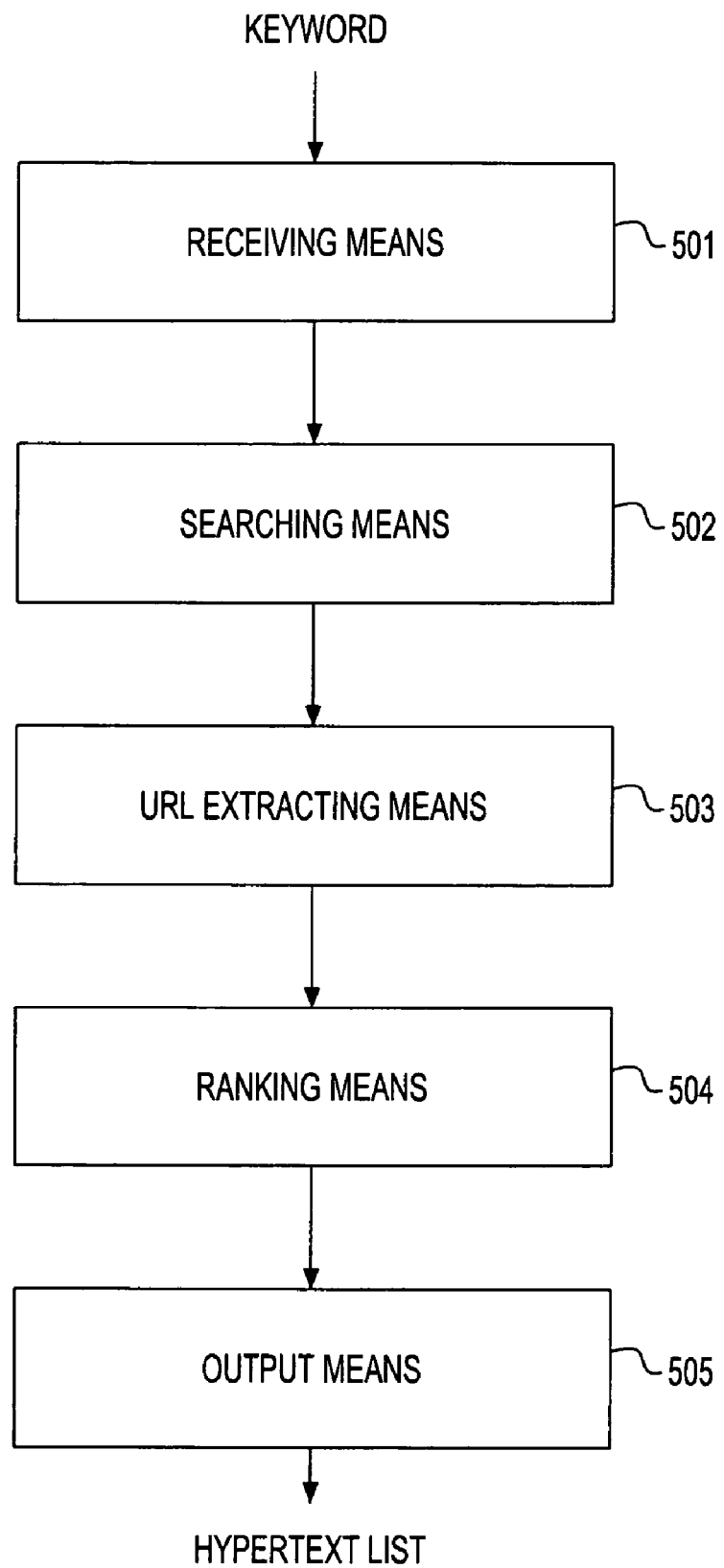
FIG. 5 shows a block diagram of a system for searching hypertext based multilingual Web information according to the present invention.

Referring to FIG. 5, a block diagram of a system for searching hypertext based multilingual Web information according to the present invention is shown. In FIG. 5, the searching system comprises a receiving means 501, a searching means 502, a hyperlink extracting means 503, a ranking means 504 and an output means 505. The receiving means 501 receives a keyword input by a user in a language A (i.e., native language), then transfers it to the searching means 502. The searching means 502 searches all the hypertexts expressed in the language A, and meanwhile matches them with a keyword such as "上海交通大学 (Shang Hai Jiao Tong Da Xue)". As described above, preferably, by using the index data downloaded from the Internet and established by a data indexing module 3, the searching means 502 can make the search faster. The hyperlink extracting means 503 extracts URL from all the hypertexts matched with the keyword, which can be implemented through the URL DB shown in FIG. 4. The extracted URL relates not only to pointing to the Web pages expressed in the language A, but also to pointing to the Web pages expressed in the language other than the language A. The extracted URL is transferred to the ranking means 504. The ranking means 504 computes the similarity of the hypertext corresponding to the URL with respect to the keyword to be queried according to equation 1, also computes the rank of each URL (Web page) according to equation 2, and then performs analysis computation on the extracted URL according to the above equation 3 combining equation 1 and equation 2 so as to conduct a comprehensive evaluation. The ranking means 504 also performs ranking according to the results of the comprehensive evaluation, for example, performs ranking according to the magnitude of the comprehensive evaluation result, R(d) value computed according to the above equation 3, where the R(d) value of the Web address most correlated with the keyword to be queried is greatest. Finally, the output means 505 returns the ranked results in the form of a hypertext list, for example, wherein the Web page corresponded to by the hyperlinks which is pointed to most (i.e., the R(d) value is greatest) includes the information which matches most with the keyword to be queried.

While the best modes for carrying out the invention has been described above, the present invention is not limited to the above embodiment, and can have various changes and modifications without departing from the scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. The methods of the present invention include signal methods, wherein at least one signal is received and/or transmitted in performing one or more steps. The term signal includes transmissions on the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method comprising searching hypertext based multilingual Web information when searching on a network for keywords to be queried, the step of searching comprising steps of:
    receiving keywords input by a user via a searching interface;
        transferring the keywords to an analysis evaluation module for computing similarity between the keywords and hypertext information in a hypertext database;
        using the analysis evaluation module for matching the keywords based on index data stored in a Web repository and performing an analysis of hyperlinks;
        conducting a comprehensive evaluation based on the computing results of hypertext information retrieving and hyperlink analysis;
        ranking hyperlinks according to the correlativity of the hyperlink text with the keywords; and
        returning to the user a ranked search result;
    wherein the hypertext similarity with respect to the keyword to be queried is determined as follows:

$$S(d_i, Q) = \frac{\sum_{j=1}^{n} d_{ij} - q_j}{\sqrt{\sum_{j=1}^{n} d_{ij}^2 - \sum_{j=1}^{n} q_j^2}}$$

where $d_i$ represents an $i^{th}$ hypertext in a Web page d, $d_{ij}$ represents a j'th dimension of the i'th hypertext, $q_j$ represents the j'th dimension of a keyword Q, and S represents a hypertext similarity $d_i$ with said keyword Q.

2. The computer-implemented method of claim 1, further comprising:
    downloading Web pages in advance of the Internet and conducting data indexing, for quickly searching for the hypertext matched with the keyword to be queried; and
    wherein the hyperlink ranking step further comprises performing ranking on the hyperlinks according to hypertext similarity with respect to the keyword to be queried and hyperlink ranks.

3. The method of claim 1 further comprising wherein preceding the step of receiving keywords the method comprises steps of:
- using a web crawler to download from the Internet a plurality of Web pages, wherein the Web pages comprise hypertext information;
- extracting from the Web pages all hyperlink texts and corresponding hyperlink addresses as well as Web page titles and multilingual Web information; and
- processing the Web pages and storing the retrieved Web pages in a Web repository containing a URL database.

4. The method of claim 1 further comprising wherein preceding the step of conducting a comprehensive evaluation the method comprises the step of:
- computing a similarity S of the hypertext with respect to the keyword to be queried, wherein each of hypertext $d_j$ and keyword Q is represented by a vector, and a cosine value of the angle between the two vectors represents the similarity S.

5. The computer-implemented method of claim 2, wherein the hyperlink rank is determined through the following iterative computation:

$$PR(v) = \varepsilon/n + (1-\varepsilon) \sum_{u,v \in G} PR(u)/outlink(u)$$

where PR(v) refers to the rank of a Web page v, outlink(u) refers to the number of all the hyperlinks in a Web page u, n is the number of all Web pages, and $\epsilon$ is an adjusting parameter.

6. The computer-implemented method of claim 3, wherein after conducting comprehensive evaluation according to the following computation, ranking is performed according to the comprehensive evaluation value:

$$PR(v) = \varepsilon/n + (1-\varepsilon) \sum_{u,v \in G} PR(u)/outlink(u)$$

$$R(d) = PR(d)\{1 + \delta \cdot S(d, Q)\}$$

where PR(v) refers to the rank of a Web page v, outlink(u) refers to the number of all the hyperlinks in a Web page u, n is the number of all Web pages, and $\delta$ is an adjusting parameter;
- R(d) is the comprehensive evaluation value, S represents the similarity of the hypertext $d_j$ included in the Web page d with the keyword Q, and parameter $\delta$ is used to adjust the weights of PR(d) and S in the computation of R(d).

7. A computer system comprising:
- a web crawler configured for downloading information from the Web, wherein the information comprises hypertext-based multilingual Web information;
- a storage device storing an index of the hypertext-based multilingual Web information;
- an analysis evaluation module configured to search for keywords in the index of the hypertext based multilingual Web information for keywords and for computing similarity of hypertext corresponding to the URL with respect to the keywords;
- an interface device for receiving the keywords input by a user;
- a processor configured for:
  - searching for the keywords, for all hypertexts whose representing language is the same as a language representing the keywords and which matches the keywords to be queried;
  - extracting hyperlinks related to an arbitrary language from all the searched hypertexts;
  - conducting a comprehensive evaluation based on the computing results of hypertext information retrieving and the hyperlink analysis;
  - ranking the extracted hyperlinks according to the correlativity of the hyperlinks with the keywords to be queried; and
- wherein the interface device is also for returning to the user ranked search results and the similarity of the hypertext with respect to the keyword to be queried is determined as follows:

$$S(d_i, Q) = \frac{\sum_{j=1}^{n} d_{ij} - q_j}{\sqrt{\sum_{j=1}^{n} d_{ij}^2 - \sum_{j=1}^{n} q_j^2}}$$

where $d_j$ represents an $i^{th}$ hypertext in a Web page d, $d_{ij}$ represents a $j^{th}$ dimension of the $i^{th}$ hypertext, $q_j$ represents the $j^{th}$ dimension of a keyword Q, and S represents a hypertext similarity $d_i$ with said keyword Q.

8. The system of claim 7, wherein after the ranking, the hyperlink which is pointed to most includes the information matched most with the keyword.

9. The system of claim 7, wherein: the web crawler conducts data indexing, for quickly searching for the hypertext matched with the keyword to be queried; and ranking the extracted hyperlinks performs ranking on the hyperlinks according to hypertext similarity with respect to the keyword to be queried and hyperlink ranks.

10. The system of claim 9, wherein the hyperlink rank is determined through the following iterative computation:

$$PR(v) = \varepsilon/n + (1-\varepsilon) \sum_{u,v \in G} PR(u)/outlink(u)$$

where PR(v) refers to the rank of a Web page v, outlink(u) refers to the number of all the hyperlinks in a Web page u, n is the number of all Web pages, and $\epsilon$ is an adjusting parameter.

11. The system of claim 9, wherein after conducting comprehensive evaluation according to the following computation, ranking is performed according to the comprehensive evaluation value:

$$PR(v) = \varepsilon/n + (1-\varepsilon) \sum_{u,v \in G} PR(u)/outlink(u)$$

$$R(d) = PR(d)\{1 + \delta \cdot S(d, Q)\}$$

where PR(v) refers to the rank of a Web page v, outlink(u) refers to the number of all the hyperlinks in a Web page u, n is the number of all Web pages, and $\epsilon$ is an adjusting parameter; R(d) is the comprehensive evaluation value, S represents the similarity of the hypertext $d_i$ contained in the Web page d with the keyword Q, and parameter $\delta$ is used to adjust the weights of PR(d) and S in the computation of R(d).

12. An article of manufacture comprising a physical computer usable storage medium having computer readable program code means embodied therein for causing a processor to search for hypertext based multilingual Web information for searching on a network for keywords to be queried, the computer readable program code means in said article of manufacture for causing a computer to perform the steps of:

receiving keywords input by a user via a searching interface;

searching for the keywords, for all hypertexts having a representing language the same as a language representing the keywords and which matches the keywords;

extracting hyperlinks related to an arbitrary language from all the searched hypertexts;

transferring the keywords to an analysis evaluation module for computing similarity between the keywords and hypertext information in a hypertext database;

using the analysis evaluation module for matching the keywords based on index data stored in a Web repository and performing an analysis of hyperlinks;

conducting a comprehensive evaluation based on the computing results of hypertext information retrieving and the hyperlink analysis;

ranking the extracted hyperlinks according to the correlativity of the hyperlinks with the keywords to be queried; and returning to the user ranked search results wherein:
in the hyperlink ranking step, the hyperlink which is pointed to most includes the information comprising the most matches with the keyword in the native language hypertext searching step, Web pages are downloaded in advance from the Internet;

data indexing is conducted for quickly searching for the hypertext matched with the keyword; and the hyperlink ranking step performs ranking on the hyperlinks according to hypertext similarity with respect to the keyword to be queried and hyperlink ranks;

wherein the hypertext similarity with respect to the keyword is determined as follows:

$$S(d_i, Q) = \frac{\sum_{j=1}^{n} d_{ij} - q_j}{\sqrt{\sum_{j=1}^{n} d_{ij}^2 - \sum_{j=1}^{n} q_j^2}}$$

where $d_i$ represents an $i^{th}$ hypertext in a Web page d, $d_{ij}$ represents a $j^{th}$ dimension of the $i^{th}$ hypertext, $q_j$ represents the $j^{th}$ dimension of a keyword Q, and S represents a hypertext similarity $d_i$ with the keyword Q;

wherein the hyperlink ranking is determined through the following iterative computation:

$$PR(v) = \varepsilon/n + (1-\varepsilon) \sum_{u,v \in G} PR(u)/outlink(u)$$

where PR(v) refers to the rank of a Web page v, outlink(u) refers to the number of all the hyperlinks in a Web page u, n is the number of all Web pages, and $\epsilon$ is an adjusting parameter;

wherein after conducting comprehensive evaluation according to the following computation, the hyperlink ranking is performed according to the comprehensive evaluation value:

$$PR(v) = \varepsilon/n + (1-\varepsilon) \sum_{u,v \in G} PR(u)/outlink(u)$$

$$R(d) = PR(d)\{1 + S - S(d, Q)\}$$

wherein PR(v) refers to the rank of a Web page v, outlink(u) refers to the number of all the hyperlinks in a Web page u, n is the number of all Web pages, and $\epsilon$ is an adjusting parameter;

wherein R(d) is the comprehensive evaluation value, S represents the similarity of the hypertext $d_j$ included in the Web page d with the keyword Q, and parameter $\delta$ is used to adjust the weights of PR(d) and S in the computation of R(d).

* * * * *